United States Patent [19]

Toussaint et al.

[11] Patent Number: 4,873,146
[45] Date of Patent: Oct. 10, 1989

[54] TRANSPARENT FIRE-SCREENING PANELS

[75] Inventors: Francois Toussaint, Montignies-le-Tilleul; Pierre Goelff, Nalinnes, both of Belgium

[73] Assignee: Glaverbel, Brussels, Belgium

[21] Appl. No.: 125,994

[22] Filed: Nov. 27, 1987

[30] Foreign Application Priority Data

Dec. 1, 1986 [LU]  Luxembourg ............................ 86691

[51] Int. Cl.$^4$ ........................ B32B 9/00; B32B 17/06; B27N 9/00; C09K 21/00
[52] U.S. Cl. ...................................... 428/428; 428/913; 428/920; 428/921; 252/601; 252/606; 106/18.12; 106/74; 156/99; 156/100; 156/106
[58] Field of Search ............... 428/446, 448, 428, 913, 428/920, 921, 331, 410, 68, 76, 330, 34; 252/601, 606, 609, 2; 156/99, 100, 104, 106; 52/232

[56] References Cited

U.S. PATENT DOCUMENTS

| | | | |
|---|---|---|---|
| 3,625,722 | 12/1971 | Freyhold et al. | 106/74 |
| 3,884,863 | 5/1975 | Beers et al. | 524/158 |
| 3,893,864 | 7/1975 | Beers | 106/287.17 |
| 3,988,282 | 10/1976 | Beers | 524/442 |
| 4,066,598 | 1/1978 | Beers et al. | 524/440 |
| 4,146,509 | 3/1979 | Markusch et al. | 521/115 |
| 4,234,639 | 11/1980 | Graham | 428/144 |
| 4,268,581 | 5/1981 | DeBoel | 428/446 |
| 4,288,252 | 9/1981 | Neely | 106/74 |
| 4,297,252 | 10/1981 | Caesar et al. | 252/606 |
| 4,312,673 | 1/1982 | Neely, Jr. | 106/74 |
| 4,319,926 | 3/1982 | Nowakowski et al. | 106/74 |
| 4,433,016 | 2/1984 | Neely, Jr. et al. | 106/74 |

FOREIGN PATENT DOCUMENTS 2023452 1/1980 United Kingdom .
1604388 12/1981 United Kingdom .

*Primary Examiner*—Howard J. Locker
*Attorney, Agent, or Firm*—Spencer & Frank

[57] ABSTRACT

A transparent fire-screening glazing panel has at least one solid intumescent layer comprising a hydrated alkali metal silicate and at least one sheet of glazing material, and the layer of intumescent material contains at least one silicate-stabilizing agent. Suitable stabilizing compounds include at least partially dissociated nitrogenized organic compounds, especially quaternary ammonium compounds such as tetramethylammonium hydroxide. To manufacture such a panel, the silicate-stabilizing agent may be incorporated into an aqueous solution of the intumescent material which is then hardened by drying to form the layer. Alternatively, the silicate-stabilizing agent may be incorporated into an aqueous solution of the intumescent material which is then dried to form grains which are subsequently incorporated into a layer held sandwiched between two sheets of glazing material.

19 Claims, No Drawings

TRANSPARENT FIRE-SCREENING PANELS

BACKGROUND OF THE INVENTION

FIELD OF THE INVENTION

This invention relates to a transparent fire-screening glazing panel having at least one solid intumescent layer comprising a hydrated alkali metal silicate and at least one sheet of glazing material. The invention includes a process of manufacturing such a panel.

Layers of intumescent material are often associated with sheets of glazing material to form fire-screening panels. For example such a layer may be sandwiched between two glass sheets. A very important application of such panels is as transparent closures of viewing apertures of rooms or other enclosures where there may be a risk of fire.

It is extremely important that the intumescent material layer of such a panel should be transparent and that it should maintain high transparency and acceptable optical properties until it starts to become tumid on the outbreak of fire.

One problem which is associated with the use of hydrated silicate layers as intumescent material is the rapid aging of the material over the course of time. This aging is apparent as a reduction in the transparency of the hydrated intumescent material which in turn reduces the transparency of the panel. Such a deterioration in the properties of a panel will clearly be prejudicial to its use.

The problem of reduced transparency on aging of a fire-screening panel has been known for many years, and various attempts have been made to solve this problem. A major cause of the reduction in transparency has been the appearance of micro-bubbles in or at the surface of the layer, and it is known to make up the solution of the hydrated alkali metal silicate using water which has been degassed, and to take care when mixing the solution not to agitate the solution to such an extent that air or other gas becomes redissolved so that it can reappear as the dried layer ages. While this gives an improvement in the aging properties of the panel, it is not entirely satisfactory. While some known fire-screening panels may have suitable aging properties for use in the interior of a building, we have found that their aging properties are not good enough if they are to be used in circumstances where they are exposed to mild heat, for example due to direct sunlight. This aspect of the problem is manifested in the appearance of haze in the intumescent layer, and it is an object of the present invention to provide a fire-screening panel of the kind referred to in which the appearance of haze is delayed.

SUMMARY OF THE INVENTION

According to the present invention, there is provided a transparent fire-screening glazing panel having at least one solid intumescent layer comprising a hydrated alkali metal silicate and at least one sheet of glazing material, characterised in that the layer of intumescent material contains at least one silicate-stabilizing agent.

A panel according to the invention has improved aging properties, in particular because the appearance of haze in the intumescent layer is delayed or inhibited.

The reasons why this should be so are not wholly clear. It is presently believed that the silicate-stabilizing agent acts to inhibit phase separation in the solid layer of intumescent material. Phase separation could give rise to a discontinuity in the structure of the layer which could result in the appearance of haze. This theory is only offered as an explanation of the phenomenon, and the fact of improved aging properties does not depend on it.

Silicate-stabilizing agents are in fact known per se from products to be used as paints, for example see U.S. Pat. No. 3 625 722 (assigned to Philadelphia Quartz Company). In the field of paints, very different problems are encountered. A particular problem, which is solved by the use of such silicate-stabilizing agents, is the requirement for rapid setting to form a bond in the dried paint which is insoluble in water and thus weather resistant: this requirement may be met by having a very high ratio of silica to alkali in the silicate mix, and in the absence of the stabilizing agent, such a solution apparently has a very short shelf life. This is a very different problem from that which is addressed by the present invention, namely the prevention or delay of the appearance of haze in a solid layer of hydrated silicate. As has been mentioned, this problem has been known for some time, and no satisfactory solution has previously been proposed.

The invention presents a further advantage. We have known for some time that the ratio of silica to alkali in a layer of hydrated alkali metal silicate has an important effect on the behaviour of the layer on exposure to fire, and that for good fire resistance, that ratio should be rather higher than has previously been capable of use due to its poor optical properties. By the adoption of this invention, we have found that it is very much easier to adjust the ratio between the silicate and the alkali to a level which is beneficial for fire resistance while still maintaining good and lastingly good optical properties.

DESCRIPTION OF THE PREFERRED EMBODIMENTS

Preferably, the silicate-stabilizing agent comprises at least one nitrogenized organic compound which is at least partially dissociated. Such compounds easily allow stabilisation of silicate-based intumescent materials without colouring them or adversely affecting their transparency or fire resisting properties. If the hydrated alkali metal silicate does not itself have a sufficiently basic character to dissociate, at least partially, the nitrogenised compound chosen, it is enough to add to the silicate a small quantity of a strong base such as sodium hydroxide in order to increase the basicity of the material in the intumescent layer.

In some preferred embodiments of the invention, the nitrogenized compound is an amino compound. Amino compounds which are at least partially dissociable in a basic medium have been found very efficacious for the stabilization for layers of intumescent material. It is for example possible to make use of a nitrogenized compound having the general formula $R_2NH$ in which R is an alkyl radical preferably having less than ten carbon atoms, such compound being at least partially dissociable in a basic medium. Such a compound, admixed with a basic medium essentially comprising a hydrated alkali metal silicate with the optional addition of a small quantity of a strong base, constitutes a silicate-stabilizing agent which is useful for putting the invention into effect. A ternary amine which is at least partially dissociable in a basic medium can likewise be used as silicate-stabilizing agent.

In other preferred embodiments of the invention, the silicate-stabilizing agent comprises at least one quaternary ammonium compound. Such products are very effective as stabilizing agents for the silicate in an intumescent layer. Tetramethylammonium hydroxide is an especially suitable silicate-stabilizing agent. It is very easily soluble in starting solutions which are used for forming the layer of intumescent material, and this represents a considerable advantage in manufacture of the panel.

These organic compounds have the advantage of disappearing when the panel is subjected to the action of fire. The compounds in their at least partially dissociated form provide hydroxyl ions which participate in the stabilization of the silicate solution without modifying the weight ratio of the silica in the alkali metal silicate. They thus do not give rise to any deterioration in the resistance of the panel to fire as compared with a panel lacking the stabilizing agent but otherwise identical.

The stabilizing agent may be present in the layer in a proportion of several percentage points, without of course exceeding its limit of solubility in the layer of intumescent material. Preferably, however, the silicate-stabilizing agent is present in an amount not more than 1% by weight of the layer, and preferably in an amount between 0.2 and 0.6% by weight of the layer. It is surprising that the use of such small proportions of stabilizing agent can give rise, as it does, to appreciable advantages. This is of particular importance because the specific consumption of stabilizing agent in the manufacture of the panels is very small, and accordingly the additional cost of using such agent in the product is very low.

We have already referred to the fact that the adoption of the present invention makes it very easy to adjust the ratio between the silica and the alkali in the intumescent layer to a level which is beneficial for fire resistance while maintaining good optical properties. It is to be noted that hydrated alkali metal silicates which are particularly rich in silica tend to present a better performance from the point of view of fire resistance, but also that layers of such materials tend to be more difficult to manufacture. In preferred embodiments of the invention, the hydrated alkali metal silicate is a sodium silicate having a weight ratio of $SiO_2:Na_2O$ of from 2.5 to 5 and preferably of from 3 to 4 inclusive. Panels incorporating intumescent layers of such silicates represent a very favourable compromise as between ease of manufacture, good fire resistance and good optical properties.

In preferred embodiments of the invention, the intumescent layer has a residual water content of between 25% and 35% by weight.

Advantageously, the intumescent layer contains an adjuvant selected from saccharides and polyhydric alcohols having six or less hydroxyl groups which adjuvant is adapted to affect intumescence so that heat transfer across the panel on the outbreak of fire is delayed. Glycerine, ethylene glycol and sucrose are examples of especially suitable adjuvants. Such adjuvants give improved fire resistance to the panel. Glycerine and ethylene glycol have a further very important advantage when the layer of intumescent material is formed directly by drying a solution of that material, in that they assist rapid drying of the layer with a reduced tendency for the layer to crack. This allows the formation of thick transparent layers without a very long drying time.

Preferably, said adjuvant is present in a proportion of not more than 10% by weight of the layer. Such proportions are found optimum for achieving the desired result.

Advantageously, the or an intumescent layer is sandwiched between two sheets of glazing material, preferably in such a way as to bond those sheets together. This protects the layer against physical damage and can provide a convenient pane for insertion in a frame to form a viewing closure.

The invention also provides a process of manufacturing a transparent fire-screening glazing panel having at least one solid intumescent layer comprising a hydrated alkali metal silicate and at least one sheet of glazing material. This process is characterised in that at least one silicate-stabilizing agent is incorporated into an aqueous solution of the intumescent material which is then hardened by drying to form the layer.

Such a process permits the formation of a layer of intumescent material which has good optical properties and which conserves those properties over the course of time without being subject to premature aging. It allows the manufacture of a fire-screening panel incorporating an intumescent layer which at the same time has a good resistance against fire and good transparent properties which are conserved for a considerably longer period (in the absence of fire) than are those of a panel which does not incorporate such a silicate-stabilizing agent but is otherwise identical.

Furthermore, the incorporation of such a silicate-stabilizing agent allows a more easy adjustment of the ratio of silica to alkali in the layer of hydrated alkali metal silicate to a level which is beneficial for fire resistance while still maintaining good and lastingly good optical properties. In the case for example of sodium silicate, the silicate stabilizing agent allows an increase in the ratio $SiO_2:Na_2O$ towards values which are more favourable for fire resistance than are the $SiO_2:Na_2O$ ratios of hydrated sodium silicate solutions which are generally commercially available.

Advantageously, the aqueous solution of the intumescent material is, or is rendered, sufficiently basic at least partially to dissolve a nitrogenized organic compound constituting the silicate-stabilizing agent. This is a very simple way of stabilizing the intumescent material without risk of prejudice to the fire-resistance of the panel incorporating it. If the alkali metal silicate is not itself sufficiently basic for this purpose, a small quantity of a strong base such as NaOH may be added whereby for example a secondary or ternary amine in at least partially dissociated form can act as silicate- stabilizing agent.

In some preferred embodiments of the invention, tetramethylammonium hydroxide is incorporated as silicate-stabilizing agent into the aqueous solution of the intumescent material in an amount between 0.1 and 0.3% by weight before drying to form the coating. This is a very simple and effective way of forming a stable layer of intumescent material in a fire-screening panel, resulting in a layer having good resistance to haze formation in the course of time.

The silicate solution may for example be spread out over a flexible sheet of plastic material and hardened by drying to form a uniform layer. Once the layer is hardened, it may be applied to a rigid sheet of glazing material and the plastic sheet may be peeled away. A further rigid sheet of glazing material may be applied to the hardened layer on the first sheet, and the assembly may be bonded together to form a laminated pane if desired.

It is preferred however that the aqueous solution of the intumescent material is poured over a sheet of glazing material and is then hardened by drying in situ to form a coating which adheres to the sheet. This avoids certain unnecessary manufacturing steps and it makes it easier to preserve the integrity and quality of the layer.

The glazing material used may be a sheet of substantially rigid plastic material, but it is preferably vitreous material.

The invention also includes a process of manufacturing a transparent fire-screening glazing panel having at least one solid layer of intumescent material comprising a hydrated alkali metal silicate held sandwiched between two sheets of glazing material, characterised in that at least one silicate- stabilizing agent is incorporated into an aqueous solution of the intumescent material which is then dried to form grains which are subsequently incorporated into such a sandwiched layer.

Preferably, the grains are sandwiched between the sheets and are transformed into a layer which serves to bond the sheets together.

For example the silicate solution may be dried on a heated rotating drum. Rapid drying of a hydrated alkali metal silicate for forming an intumescent layer such as takes place on a rotating drum is known to promote a rapid phase separation within the silicate layer and poor aging properties. The process according to this invention inihibits such phase separation when rapidly drying silicate as on a rotating drum, so allowing the formation of a transparent fire-screening panel which maintains its transparency over a longer period than is possible without the use of the silicate-stabilizing agent. Preferred embodiments of the invention will now be described merely by way of example.

EXAMPLE 1

A transparent fire-screening panel comprising a layer of intumescent material sandwiched between two glass sheets was manufactured in the following way.

An aqueous solution was made up to contain 64% by weight water and sodium silicate having a weight ratio of $SiO_2:Na_2O$ of 3.4:1, and to this was added 2% by weight of glycerine. The use of glycerine helps to reduce the tendency of a layer of sodium silicate to crack as it dries as described in French Patent No. 2 399 513 (British Patent No. 1 604 388). In accordance with this invention, a silicate-stabilizing agent was added to the silicate solution. In this example, the agent used was tetramethylammonium hydroxide in an amount of 0.3% by weight of the solution. This solution was then poured out onto a 4mm thick sheet of ordinary soda-lime glass, to form a uniform coating 2.8mm in thickness. The coated sheet was placed in a chamber in which the temperature was progressively increased to 90° C. with a relative humidity of about 85% in order to dry the intumescent material to a water content of about 29% by weight of the layer. The tetramethylammonium hydroxide was present in the resulting coating in an amount of about 0.55% by weight of the layer. This drying operation lasted about 20 hours. The sheet of glass bearing the dried silicate layer was then assembled to another sheet of glass in a manner known per se to form a transparent laminated fire- screening panel.

The resulting panel was subjected to an accelerated aging test in which the panel was subjected to a temperature of 80° C. for 5 days. At the end of this time, no haze was discerned in the panel. For comparison purposes, a second panel was constructed following exactly the same steps save that the addition of the stabilizing agent was omitted. When subjected to the same accelerated aging test, a light haze was detected in the intumescent layer.

In a variant of this Example, the glycerine was replaced by 1% sucrose. Similar results were given

EXAMPLE 2

A second transparent fire-screening panel, similar to that of Example 1, was manufactured in the following way.

A commercially available aqueous solution containing 60 to 70% by weight water and sodium silicate having a weight ratio of $SiO_2:Na_2O$ of between 3.3:1 and 3.4:1 was taken and to this was added 1% of silicate stabilizing agent. In this Example, the silicate stabilizing agent used was a ternary amine such as trimethylamine. In order to assist dissolution of this amine, 0.2% by weight of NaOH was added to the silicate solution in order to render it sufficiently basic. The solution was dried on a heated rotating drum by the process described in Belgian Patent No. 901,910 (British Patent No. 2,155,852). The dry product was broken into grains. Because of the presence of the silicate-stabilizing agent, there was no segregation of silica within the material during drying on the drum.

The grains of dried silicate were screened to obtain a fraction having grains sizes between 0.1mm and 0.4mm, and these were placed on a sheet of glass with a binder constituted by hydrated sodium silicate having the same $SiO_2:Na_2O$ weight ratio as the grains and a water content of 67% by weight, in order to form a layer 2mm thick. The binder contained the same proportion of the same silicate-stabilizing agent as was used in the solution from which the grains were formed. The grains and the binder solution were used in the approximate volume proportions of 100:30 so that the resulting coating had a total water content of about 34% by weight. A second sheet of glass was assembled to the layer thus formed and the assembly was bonded together by a process as described in Belgian Patent No. 876,825 (British Patent No. 2,023,452) in order to form a laminate.

After accelerated aging (5 days at 80° C.) no trace of haze was discerned in the panel.

In a variant of this example, no binder was used for forming the layer on the glass sheet. A laminate was formed, and again, after the accelerated aging test, no trace of haze was descerned.

In another variant, a secondary amine such as dimethylamine was used as silicate-stabilizing agent. Again, a small quantity of a strong base such as NaOH was used to assist dissolution of the amine. Again, good results were obtained.

In a variant of the preceding Examples, a solution containing sodium silicate having a weight ratio of $SiO_2:Na_2O$ of 5:1 was made up containing about 8% of tetramethylammonium hydroxide as silicate-stabilizing agent. The use of this agent has considerable benefits even for making up the solution. After drying in the form of a layer, this material can be incorporated into a fire-screening panel having excellent fire-resisting properties and which does not exhibit haze after being subjected to the accelerated aging test.

I claim:
1. A transparent fire-screening glazing panel, comprising:

at least one solid intumescent material layer comprised of a hydrated alkali metal silicate and at least one silicate-stabilizing agent which inhibits loss of transparency by haze formation in the at least one solid intumescent material; and at least one sheet of glazing material.

2. A panel according to claim 1, wherein the silicate-stabilizing agent comprises at least one nitrogenized organic compound which is at least partially dissociated.

3. A panel according to claim 2, wherein said nitrogenized compound is an amino compound.

4. A panel according to claim 2, wherein said silicate-stabilizing agent comprises at least one quaternary ammonium compound.

5. A panel according to claim 4, wherein said silicate-stabilizing agent comprises tetramethylammonium hydroxide.

6. A panel according to claim 1, wherein said silicate-stabilizing agent is present in an amount ranging from an effective amount up to not more than 1% by weight of said at least one solid intumescent material layer.

7. The panel according to claim 6, wherein said silicate-stabilizing agent is present in an amount ranging from 0.2 up to 0.6% by weight of said at least one solid intumescent material layer.

8. A panel according to claim 1, wherein said hydrated alkali metal silicate is a sodium silicate having a weight ratio of $SiO_2:Na_2O$ ranging from 2.5 to 5.

9. The panel according to claim 8, wherein said sodium silicate has a weight ratio of $SiO_2:Na_2O$ ranging from 3 to 4.

10. A panel according to claim 1, wherein said solid intumescent layer has a residual water content of between 25% and 35% by weight.

11. A panel according to claim 1, wherein said at least one solid intumescent material layer contains an adjuvant selected from the group consisting of saccharides and polyhydric alcohols having six or less hydroxyl groups, which adjuvant is intumescent so that heat transfer across said transparent fire-screening glazing panel on an outbreak of fire is delayed.

12. A panel according to claim 11, wherein said adjuvant is present in a proportion of not more than 10% by weight of said intumescent layer.

13. A panel according to claim 1, wherein said intumescent layer is sandwiched between two sheets of glazing material.

14. A process of manufacturing a transparent fire-screening glazing panel comprised of at least one solid intumescent material layer comprising a hydrated alkali metal silicate, and at least one sheet of glazing material, the process comprising:

incorporating at least one silicate-stabilizing agent for inhibiting loss of transparency by haze formation in the at least one solid intumescent material layer into an aqueous solution of said hydrated alkali metal silicate;

coating said aqueous solution onto at least one of said at least one sheet of glazing material to provide at least one coated sheet; and drying the coating of said at least one coated sheet to form said at least one solid intumescent material layer thereon.

15. A process according to claim 14, wherein said aqueous solution of said intumescent material is, or is rendered, sufficiently basic at least partially to dissolve a nitrogenized organic compound constituting said silicate-stabilizing agent.

16. A process according to claim 14, wherein tetramethylammonium hydroxide is incorporated as said silicate-stabilizing agent into said aqueous solution of the intumescent material in an amount between 0.1 and 0.3% by weight before drying to form said layer.

17. A process according to claim 14, wherein said aqueous solution of said intumescent material is poured over a said sheet of glazing material and is then hardened by drying in situ to form said layer which adheres to said sheet.

18. A process of manufacturing a transparent fire-screening glazing panel comprised of at least one solid layer of intumescent material comprising a hydrated alkali metal silicate held sandwiched between two sheets of glazing material, the process comprising:

incorporating at least one silicate-stabilizing agent which inhibits loss of transparency by haze formation in the at least one solid intumescent material layer into an aqueous solution of said hydrated alkali metal silicate;

drying said aqueous solution to form grains; and sandwiching said grains between said two sheets of glazing material.

19. A process according to claim 18, wherein said grains are sandwiched between said sheets and are transformed into a layer which serves to bond said sheets together.

* * * * *